United States Patent [19]

Pearce et al.

[11] 4,004,199
[45] Jan. 18, 1977

[54] ELECTRICAL COMPONENT SEAL

[75] Inventors: Godfrey Roy Pearce; Kenneth Drew Beard; Donald Lloyd Shively, all of Glasgow, Ky.

[73] Assignee: P. R. Mallory & Co. Inc., Indianapolis, Ind.

[22] Filed: May 6, 1975

[21] Appl. No.: 575,106

Related U.S. Application Data

[63] Continuation of Ser. No. 369,279, June 12, 1973, which is a continuation of Ser. No. 136,542, April 22, 1971, which is a continuation of Ser. No. 810,972, March 27, 1969.

[52] U.S. Cl. .............................. 317/230; 429/54; 174/52 S
[51] Int. Cl.² .......................................... H01G 9/00
[58] Field of Search ................ 317/230; 174/52 S; 429/54

[56] References Cited

UNITED STATES PATENTS

| | | | |
|---|---|---|---|
| 2,144,959 | 1/1939 | Blackburn | 317/230 |
| 2,190,827 | 2/1940 | Deeley | 317/230 |
| 2,884,575 | 4/1959 | Lilienfeld | 317/230 |
| 3,114,085 | 12/1963 | Ruscetta et al. | 317/230 |
| 3,243,668 | 3/1966 | Diggens | 317/230 |

Primary Examiner—Michael J. Lynch
Assistant Examiner—Joseph E. Clawson, Jr.
Attorney, Agent, or Firm—Hoffmann & Meyer

[57] ABSTRACT

A three membered capacitor sealing structure is disclosed including a lower vinyl thermoplastic layer, a layer of natural or synthetic rubber, and an upper layer for rigidity. The layers may contain vents, openings, and/or piercings.

8 Claims, 4 Drawing Figures

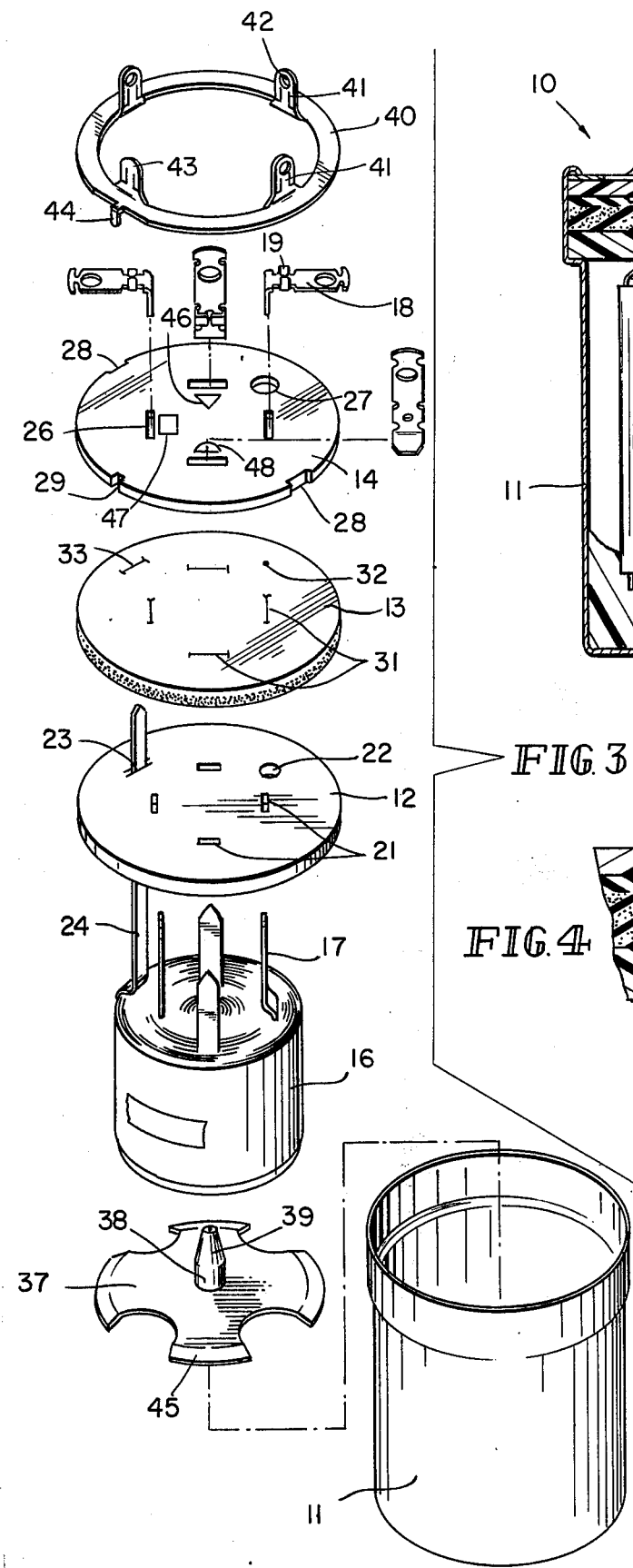

ELECTRICAL COMPONENT SEAL

This is a continuation of application Ser. No. 369,279, filed June 12, 1973, which in turn is a continuation of application Ser. No. 136,542, filed Apr. 22, 1971, which in turn is a continuation of application Ser. No. 810,972, filed Mar. 27, 1969.

This invention relates to seals for electrolytic capacitors.

It is desirable for an electrolytic capacitor seal to be effective in each of the following areas. The seal should effect a hermetic seal to a substantial extent. The seal should be substantially non-reactive with the electrolyte system used in the capacitors. The seal should have high insulative characteristics. The seal should also have venting properties so that when the capacitor is subjected to high internal pressures or high temperatures during the life of the capacitor, gasses can escape from the capacitor to reduce the pressure and temperature. The seal should have stable mechanical properties over large extremes of temperature. Finally, the seal should absorb very little of the electrolyte and very little moisture. The seal has a tendency to become electrically conductive after absorbing the electrolyte.

In the drawings, FIGS. 1 and 1A are sectional views of capacitor seals of the prior art;

FIG. 2 is a sectional view of the capacitor and capacitor seal of the present invention;

FIG. 3 is an exploded view of a capacitor and seal of the present invention; and, FIG. 4 is an enlarged view of an embodiment of the seal of the present invention.

It has previously been proposed to form a seal as shown in FIG. 1. A rubber internal sealing ring 1 containing carbon or other material, as a filler material, to obtain a sealing effect is placed in capacitor can 2 on the shoulder 3 thereof. Bakelite or phenolic member 4 is then placed over the rubber ring 1 and the capacitor is crimped or spun at 5 to hold the seal in place. Anode leads 6 pass through the seal and are affixed to terminals 7 by soldering, welding or other means known in the art.

Another proposal is shown in FIG. 1A. Here a phenolic resin ring 1A is placed in a capacitor can 2A at its shoulder 3A. On the ring 1A is placed a layer of uncured rubber 4A again containing carbon or other filler material. An additional layer of phenolic resin 5A is placed over the rubber ring. Anode leads 6A pass through openings formed in the members 1A, 4A and 5A, and are soldered or otherwise affixed to terminal 7A.

The proposals shown in FIGS. 1 and 1A have not been entirely satisfactory because these assemblies have shown poor sealing characteristics when subjected to temperature extremes due to the marginal mechanical and electrical properties of the materials used under temperature extremes. Also in applications involving environments of high humidity and where large voltage gradients exist between adjacent portions of the seal structure, poor sealing characteristics of the structures of FIGS. 1 and 1A have been observed.

Particularly, Bakelite and phenolic resins tend to distort and buckle when subjected to high humidity environments encountered within the functioning of the capacitor. Furthermore, Bakelite and phenolic resins tend to absorb as much as 5% by weight of the operating electrolyte. Since the electrolyte is of low ohmic resistance, this causes the seal structure to have low insulation resistance. This in turn results in high internal electrical current loss causing high temperature, and during high temperature the sealing properties of Bakelite and phenolic resins are not particularly good.

It is an object of the present invention to provide a capacitor seal which is effective during temperature extremes.

It is another object of the present invention to provide a capacitor seal which is effective in humid environments.

It is another object of the present invention to provide a capacitor seal which is effective during high voltage gradients between adjacent portions of the seal structure.

It is another object of the present invention to provide a seal which will absorb very little moisture.

It is another object of the present invention to provide a seal which will absorb very little of the electrolyte of the capacitor.

It is another object of the present invention to provide a seal which allows the use of electrolyte systems not previously possible with phenolic and similar materials.

It is another object of the present invention to provide a capacitor seal which possesses the previously mentioned desirable qualities of the capacitor seal.

It is another object of the present invention to provide a substitute for paper separators in wound capacitors which has advantages over paper separators.

Other objects will be apparent from the following description.

In accordance with the present invention the aforementioned difficulties are overcome by a novel capacitor structure. As can be seen from FIGS. 2 and 3, this structure includes a seal 10 within a capacitor can 11. This seal comprises a vinyl polymeric seal member 12, a rubber insert 13 and a relatively rigid member 14. The rigid member may be held in place for example by spinning or crimping the can at 15.

The polymeric member 12 should have the following properties: it must absorb little moisture and electrolyte and be substantially unreactive with the electrolyte. In prior seals, where the electrolyte has been absorbed in the seal, there has been substantial electrical loss, and high operating temperatures have resulted, which in turn have caused poor sealing characteristics. It therefore is very important that the seal not absorb substantial moisture or electrolyte. Preferably the seal member 12 should absorb less than 1% of its own weight, preferably below 0.5% and still more preferably, below 0.2% of its own weight.

Another important property of the seal member 12 is that it give good venting properties in the event that there is high temperature and high pressure build up which may result from improper operation or faulty operation. If a polymeric material of the present invention is used for the member 12, in FIG. 2, it merely melts allowing the gases and pressure to be released rather than the capacitor catching on fire or exploding, either of which are dangerous or harmful to the device in which the capacitor is placed.

Still another property of the seal member 12 is that it be able to withstand extremes of temperature and still remain flexible and have sealing properties. Preferably the seal should be able to withstand temperatures below −20° F and above 100° F.

Still another property is that member 12 have good tensile yield strength and rigidity at room temperature, strength preferably about 3500–8000 psi. Hardness should preferably be about 50–100 Shore D scale, preferably 60–90.

Finally the seal member 12 should have the property of being able to release a small amount of gas gradually which may result from small amounts of electrolyte vaporizing. This avoids a buildup of high pressure in the capacitor which, as mentioned previously, can either cause an explosion and/or high temperatures in the capacitor. Therefore, an important property of the member 12 is the ability to vent small amounts of gasses gradually as the capacitor is operating. This is facilitated by providing openings 22 and 27 and pierced hole 32 as shown in FIG. 3.

It has been found that the foregoing properties are achieved through the use of a thermoplastic vinyl polymeric seal member.

By the term polymer is meant to include not only polymers, but co-polymers and ter-polymers, etc.

By the term thermoplastic vinyl polymeric seal member is meant a seal member which absorbs very little moisture and electrolyte, is substantially non-reactive with the electrolyte, has sufficiently good transmission properties to allow gases which have been built up in the capacitor to escape gradually, has the ability to withstand operational temperature extremes, and has good strength and rigidity at ordinary temperatures.

Preferably the vinyl polymeric seal member has the following characteristics.

The preferred material for the seal member 12 is polypropylene. While polypropylene having syndiotactic type crystallinity could be used, the preferred polypropylene used is crystalline polypropylene of the isotactic type. Polypropylene will withstand temperature extremes of −40° to +110° C under most circumstances. Polypropylene absorbs very little moisture and absorbs very little of the electrolyte. Polypropylene has a definite melt temperature so that under unfavorable operating conditions gasses generated can escape without the capacitor exploding or setting on fire. Polypropylene also has excellent gas transmission characteristics and small amounts of gasses produced in the electrolyte can escape through polypropylene very effectively. Polypropylene is relatively inexpensive for this application. Hercules pro-fax 6551 is one exemplary commercial product having suitable properties.

As to sealing member 13, it is more flexible and may have an A Scale Durometer range of about 10–70, preferably 15–60. It is preferably made of any of the known natural or synthetic rubbers including, for example, polyisoprene, polybutadiene, etc. which contain little or substantially no carbon filler. Carbon is used in the rubber found in some prior sealing members. However, it is undesired because, being a conductive material, it tends to conduct electricity.

Sealing member 14 is included to provide rigidity to the structure. It may be made of any relatively rigid plastic material or of metal. Plastic is preferred because a little bit of flexibility is desired, and because of cost. For example, Bakelite or phenolic resins are suitable

| PROPERTY | ASTM TEST | BROAD RANGE | PREFERRED RANGE | MOST PREFERRED |
|---|---|---|---|---|
| Flow Rate | D-1238 at 230° C & 2160 gm load | 20–60 gm/10 min | 30–50 gm/10 min | 35–45 gm/10 min |
| Tensile Strength | D-638 Rate 2in/min | 3500–8000 psi | 4000–7000 psi | 4500–6000 psi |
| Ultimate Elongation | D-638 Rate 2in/min | 100–350% | 125–300% | 150–250% |
| Hardness | D-1706 | 50–100 D Scale | 60–90 D Scale | 65–80 D Scale |
| Heat Distortion | D-648 66 psi (applied load) | 100–125° C | 105–120° C | 110–115° C |
| Specific Gravity | D-792 at 25° C | .85–.95 | .88–.98 | .90 ± 1 |

Exemplary materials include polyethylene, polypropylene, polybutylene, polystyrene and copolymers of ethylene and propylene, ethylene and butylene, ethylene and styrene, propylene and butylene, propylene and styrene. Since some rigidity is required for the member 12 and thus it is preferred that the polymers and copolymers used are crystalline. The crystallinity may be of either the isotactic or the syndiotactic type.

The vinyl polymeric seal member also preferably includes stabilizers to reduce any tendency of attack on the seal member. Stabilizers against chemical attack including oxidation for example, and ultraviolet radiation, may be included. Exemplary known stabilization agents include hindered phenols i.e. 2,6 di-tert-butyl phenol, 4,4' bis(2,6 di-tert-butyl phenol) and octadecyl 3-(3,5-di-tert-butyl-4-hydroxyphenyl) propionate, dilauryl 3,3' thiodipropionate; hydroxybenzophenone, hydroxyphenylbenzotriazole and phenyl solicylate. Obviously other stabilizing agents may be used within the scope of the present invention.

for this purpose. Also, other rigid polymeric materials could also be used for the member 14.

The wound capacitor body 16 is made of two electrodes at least one of which contains a formed dielectric oxide thereon. Usually D.C. capacitors have only one formed oxide, while A.C. units usually have two.

The electrolyte may be any of the known liquid impregnating electrolytes. For example, an electrolyte comprised of water, ethylene glycol, boric acid and ammonia may be used. However, it is to be understood that other impregnating electrolytes may be used according to the present invention, such as acetic acid electrolytes which have a tendency to attack phenolic resins and Bakelite if they are used as the inner seal, for example 22 in FIG. 2.

The liquid impregnated capacitor body 16 has one or more contacts or tabs extending therefrom 17 which pass through openings in the sealing members 12 and 14. A cathode tab 24 is also provided which may be connected to the can. The contacts 17 may be held in engagement with terminal members 18 by means of ears 19. Leads (not shown) may be soldered or welded to terminals 18.

As can be seen from FIG. 3 the polymeric member 12 and the relatively rigid member 14 contain a plurality of openings 21, 22, 23, 26, 27 and 28, respectively. Openings 21, 23 and 26 and 28 are for the purpose of allowing the contacts 17 and 24 to pass therethrough. Obviously the number of contacts 17 and openings 21 and 26 may vary as desired. Openings 22 and 27 are for the purposes of venting the capacitor in the event that pressures build up therein. The rubber member 13, also has openings through which the contact members pass. While these may take the same form as openings 21, 22, 26 and 27, it is preferred that these openings take the form of pierces 31, 32 and 33. By piercing the rubber member 13 and then forcing the contact members through the pierces, greater strength and rigidity is obtained in the contact member.

Also, when excessive pressure is built up in the capacitor the pierced hole 32 will permit gas to escape through hole 27 and avoid pressure building up to the capacitor bursting.

If desired a cathode connector ring 40 may be provided having tabs 41 thereon with opening 42 therein for attaching leads, the number of which may vary as desired. One or more tabs 43, however need not contain openings. These tabs may be used as locators in subsequent manual and automatic operations, for example in positioning the capacitor into circuitry, such as printed circuits. Openings 28 in the sides of member 14 are to allow cathode tabs 24 to have clearance around member 14. Tab 24 is welded to connector 40. Opening 29 may be for locating the proper position for ring 40. Tab 44 is engaged in opening 29 in an automatic assembly operation. Triangle mark 46, rectangle mark 47 and half-moon mark 48 are for indicating the terminal having a specified voltage.

If desired at the bottom of the capacitor can tar or pitch may be utilized to hold the anode in place as indicated at 36 in FIG. 2. Alternatively a spacer such as 37 could be used for this purpose for example made of plastic having a centering spindle 38 thereon which may be tapered as at 39. The spacer may have a plurality of resilient feet 45 to aid in allowing the structure to withstand shock. However, for some applications it is not necessary to provide support for the anode at the bottom of the can. The formed electrodes are separated by a moisture absorbing paper or plastic (i.e. nylon, acetate or teflon) liquid impregnated electrolyte. Plastic separators often require fewer layers than paper and will allow higher temperature operation, i.e. above 125° C, than paper. The electrode materials may be any of the known valve metal materials including for example, aluminum, tantalum, niobium, titanium and other materials, for example stainless steel (for the cathode).

Tabs 17 and 24 are connected to the wound capacitor foil in a manner well known in the art, for example by stapling prior to winding the foil. The can may be made of any metallic material which can readily be formed such as copper, brass, bronze, aluminum, aluminum alloys, etc. The can also could be a bimetal composite of for example silver with gold plated on the inside thereof, stainless steel with copper plated thereon, etc. For many applications aluminum or aluminum alloys are preferred. However, the can material is largely a matter of design choice as will be apparent to those skilled in the art.

According to another embodiment of the invention shown in FIG. 4, a three layered seal is shown. The lower member 50 is made of a vinyl polymeric material, hereinbefore described in connection with seal member 12 of FIGS. 2 and 3. Resting thereon (adhesively bonded thereto, if desired) is a layer of uncured or incompletely cured rubber 51 (natural or synthetic) having resistance to chemical attack by the electrolyte, and having Short A Scale Durometer readings of 10 to 35, preferably 15 to 32. Resting on the layer 51 and preferably adhesively bonded thereto is a layer of cured natural or synthetic rubber 52. The cured rubber should also have resistance to chemical attack by the electrolyte and should have Short A Scale Durometer readings of 30 to 65, preferably 33 to 60. As previously indicated, a rigid member 53 is also provided, for example made of a phenolic resin, having a gas vent 54.

The layers of uncured and cured rubber press against the can to make the seal more effective in extreme temperature ranges and more able to withstand mechanical jarring and shock.

In order to provide for particularly effective means for venting the capacitor when high pressures are encountered, the member 50 may contain a hole or opening 55 formed, for example by drilling. In some instances when the drilled hole merely extends through the member 50 and large pressures build up in the capacitor, it has been found that the self healing characteristics of the rubber layers prevented the pressures from being released in the capacitor. Therefore the drilled hole preferably is drilled partially into the uncured rubber as at 56. The remaining section is then pierced as at 57, so that the problem of the self healing characteristics of the rubber is avoided. After extending the drilled hole partially into the layer of uncured rubber little difficulty in venting has been observed in the capacitors. Preferably the hole extends into the uncured layer from 25 to 90%, most preferably 35 to 80%. The hole can extend all the way through the layer of uncured rubber if desired, and also into the layer of cured rubber if desired.

Seals according to the embodiment of FIG. 4, of course, have the openings previously described in connection with FIGS. 2 and 3 for contact members 17 and 24.

It will be obvious to those skilled in the art that the capacitor can and seal can be other then cylindrical. For example, the device may be rectangular or square in cross section or any other convenient shape.

We claim:

1. A seal means for closing the open end of means housing an electrical component, the seal means including a polymeric member adjacent the electrical component and having aperture means with spaced apart side walls provided therein, an uncured or incompletely cured elastomeric means adjacent the polymeric member, a cured elastomeric means adjacent the uncured or incompletely cured elastomeric means and having aperture means with abutting side walls capable of separating to open the aperture means and relieve elevated pressure associated with the electrical component and of abutting to close the aperture means when the elevated pressure is relieved and a rigid means adjacent the cured elastomeric means and having aperture means with spaced apart side walls provided therein, the aperture means in the uncured or incompletely cured elastomeric means including a portion having abutting side walls adjacent the aperture means of the cured elastomeric means and a portion having spaced apart side walls adjacent the aperture means of the polymeric member, apertures of the polymeric member and the uncured or incompletely cured elastomeric means and the cured elastomeric means and the rigid means aligned to relieve elevated pressures associated with the electrical component, the polymeric member selected from the group consisting of polyethylene, polypropylene, polybutylene, polystyrene and copolymers thereof.

2. The seal of claim 1 wherein the portion of the aperture means of the uncured or incompletely cured elastomeric means having spaced apart side walls extends from about 25 to about 90% of the total length of the aperture means of the uncured or incompletely cured elastomeric means.

3. The seal of claim 2, wherein the uncured or incompletely cured elastomeric means and the cured elastomeric means are bound together.

4. The seal of claim 1, wherein the polymer member is crystalline.

5. The seal of claim 4, wherein the polymer member includes crystalline polypropylene of the isotactic type.

6. The seal of claim 1, wherein the uncured or incompletely cured elastomeric means and the cured elastomeric means are selected from the group including natural and synthetic rubbers.

7. The seal of claim 6, wherein the rigid member is a rigid polymeric material.

8. The seal of claim 7, wherein the polymer member is substantially non-reactive chemically with electrolyte means and with moisture and electrolyte absorption of 1% or less of its own weight and a tensile strength of about 3500 to 8000 psi and an ultimate elongation rate of about 100 to 350% and a hardness of from about 50 to 100 Shore D scale, and the rubber members being substantially non-reactive with the electrolyte and electrically insulating and having an A Scale Durameter range of about 10 to 70.

* * * * *

UNITED STATES PATENT AND TRADEMARK OFFICE
CERTIFICATE OF CORRECTION

PATENT NO. : 4,004,199
DATED : January 18, 1977
INVENTOR(S) : Godfrey Roy Pearce, et al It is certified that error appears in the above-identified patent and that said Letters Patent are hereby corrected as shown below:

Column 1, line 37, delete "Bakelite" and insert ---BAKELITE---

Column 1, line 62, delete "Bakelite" and insert ---BAKELITE---

Column 1, line 65, delete "Bakelite" and insert ---BAKELITE---

Column 2, line 4, delete "Bakelite" and insert ---BAKELITE---

In Chart under Preferred Range - Specific Gravity, delete "98" and insert ---93---

Column 4, line 16, insert ®after "pro-fax"

Column 4, line 31, delete "Bakelite" and insert ---BAKELITE---

Column 4, line 62, delete "Bakelite" and insert ---BAKELITE---

Signed and Sealed this

Second Day of May 1978

[SEAL]

Attest:

RUTH C. MASON
Attesting Officer

LUTRELLE F. PARKER
Acting Commissioner of Patents and Trademarks